United States Patent [19]

Haigh

[11] 3,745,455

[45] July 10, 1973

[54] CURRENT NORMALIZER FOR PARTICLE SIZE ANALYSIS APPARATUS

[75] Inventor: Geoffrey T. Haigh, Lake Parsippany, N.J.

[73] Assignee: Particle Data, Inc., Elmhurst, Ill.

[22] Filed: June 21, 1971

[21] Appl. No.: 154,859

[52] U.S. Cl. ............................................ 324/71 CP
[51] Int. Cl. ............................................ G01n 27/00
[58] Field of Search .................... 324/71 CP, 57 PI, 324/63, 37; 343/17.7

[56] References Cited
UNITED STATES PATENTS 3,259,842  7/1966  Coulter ............................ 324/71 CP
3,394,303  7/1968  Cressman ............................ 324/37

Primary Examiner—Alfred E. Smith
Attorney—Carlton Hill, J. Arthur Gross et al.

[57] ABSTRACT

A current normalizer utilizes a pair of parallel, simultaneously programmed current generators to provide a DC current and a synthetic particle current pulse to an electric particle sensing zone for measuring the resistance of an electrolyte. The current normalizer also includes means for controlling the generation of current in response to the setting of an adjustable precision voltage source.

10 Claims, 5 Drawing Figures

INVENTOR.
Geoffrey T. Haigh

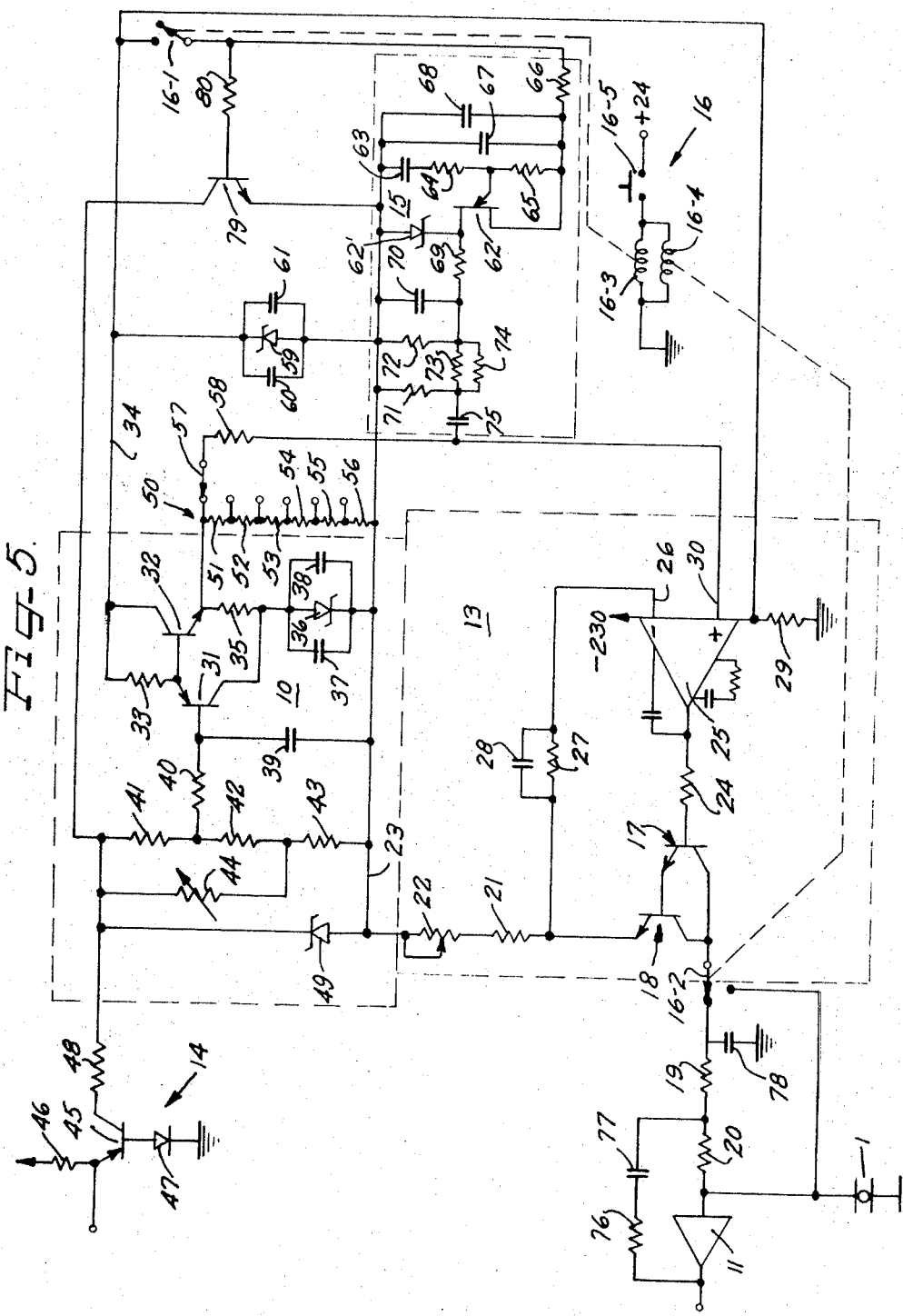

CURRENT NORMALIZER FOR PARTICLE SIZE ANALYSIS APPARATUS

BACKGROUND OF THE INVENTION

1. Field of the Invention

This invention relates to a current normalizer, and in particular to a current normalizer for measuring the resistance of an electrolyte type particle sensing zone and adjusting the current supplied thereto.

2. Description of the Prior Art

Sensing zones for particle analysis apparatus are constructed in various configurations, one of the most widely used being of the type disclosed in U.S. Pat. No. 3,345,502 of Robert H. Berg. This type of sensing zone comprises a beaker having an electrolyte containing suspended particles therein and an orifice tube containing electrolyte immersed in the electrolyte of the beaker. One terminal from a current source is positioned within the orifice tube and the other terminal of the current source is positioned within the beaker whereby modulations of the developed voltage across the orifice in the form of particle pulses may be sensed as a sample of suspended particles to be analyzed is caused to flow through the orifice. When a particle traverses a given orifice, there will be a change in the resistance of the orifice proportional to the product of the volume of the particle and the resistivity of the electrolyte. For example, for an orifice which measures 10,000 ohms, a 10-ohm change for a particle entering a given orifice might be obtained. If the resistivity of the electrolyte is changed such that the orifice resistance is 20,000 ohms, a 20-ohm change will occur for the same particle. However, when a current is forced through the electrolyte, some degree of back voltage is generated due to polarization at the electrodes.

If the current through the orifice is held constant, the momentary current change caused by passage of a particle is independent of electrolyte resistivity. If the voltage drop across the orifice alone is held constant, the voltage change caused by passage of a particle is independent of electrolyte conductivity, but holding the voltage constant is practically not achievable; whereas, holding current constant is practically achievable. When the amplifier input impedance is nearly matched to that of the orifice, a condition generally desirable for best signal to noise ratio, the amplifier is sensing partly voltage change and partly current change at the orifice. Therefore, the sensed signal is proportional to the volume of the particle and some fractional power of the resistivity of the electrolyte. Correspondingly, the provision of a voltage source to program the orifice is insufficient because the counter-emf generated by electrode polarization is a variable.

SUMMARY OF THE INVENTION

The instant invention retains the desirable condition of near impedance matching while providing means for normalizing the signal amplitudes of all particles over a wide range of electrolyte conductivity.

The present invention proposes to utilize current programming of the orifice in order that across the resistance of the orifice alone there will be given a constant voltage drop. Therefore, in order to calibrate an instrument so that a particle of a given size in a given orifice always provides the same response, it is necessary to measure the resistance of the orifice, that is, the resistance element of the orifice for a given electrolyte. The present invention therefore proposes a method to measure the resistive element of the orifice and adjust the system to compensate for that resistance.

A method for achieving the foregoing objective, hereinafter called normalization, and apparatus for carrying out the method employ a DC current generator to drive the orifice, which generator is programmable by suitable means, such as a potentiometer, rotary switch, selector switch, etc. A second current generator is provided and is simultaneously programmable with the first generator and provides Gaussian-shaped pulses of predetermined amplitude in the current realm. The current pulses simulate particle pulses and are injected into the orifice with the standard DC current. With the two current generators being simultaneously programmable, if the DC current is, for example, doubled, the amplitude of the current pulse will be simultaneously doubled. The current normalizer is therefore provided with means for providing an accurate DC current to the orifice including a precision voltage source. The normalizer is also provided with means for accurately generating current pulses (synthetic particle pulses), this latter current means also being controlled by the precision voltage source. Inasmuch as the orifice circuit is usually provided with a large filtering capacitor and some modestly large value of resistance, and as the normalizing pulses would therefore be ineffective, the normalizer is provided with means for bypassing this filter network so that the normalizing pulses are applied directly to the orifice electrodes. In addition, since the orifice circuit normally has associated therewith an amplifier for sensing particle pulses, this amplifier is provided with a take-off point which has positive unity gain with respect to the input signal. The resultant signal is fed back to the orifice coupling resistors such that a very high impedance is synthesized at said resistors in order to reduce the loading effect of said resistors.

BRIEF DESCRIPTION OF THE DRAWINGS

Many other objects, features and advantages of the invention, its organization, construction and operation, will best be understood from the following detailed description of an exemplary embodiment thereof taken in conjunction with the accompanying drawings, in which:

FIG. 5 is a schematic circuit diagram of the current normalizer illustrated in block form in FIG. 4.

DESCRIPTION OF THE PREFERRED EMBODIMENT

GENERAL DESCRIPTION

Figure 1:
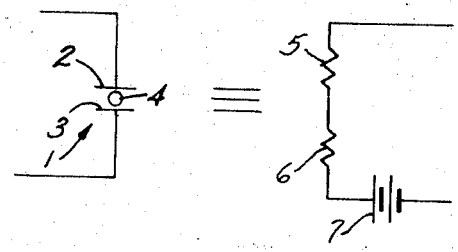
FIG. 1 is a diagram which explains the electrical characteristics of an orifice.

Referring to FIG. 1, an orifice circuit is schematically illustrated at 1 as comprising a pair of electrodes 2, 3 on each side of an orifice 4. This structure is the equivalent of a series circuit including a first resistor 5 which represents the electrical resistance R of the orifice, a resistor 6 which represents the change ΔR of the resistance R and which is proportional to the resistance R times the voltage $\Delta e$ developed across the resistance due to a particle traversing the orifice 4, and a battery 7 which represents the counter emf of the contact potentials of the electrodes 2, 3.

Figure 2:
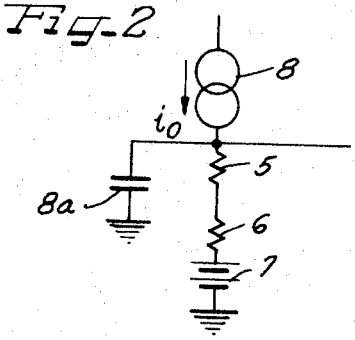
FIG. 2 is an electrical circuit diagram of an orifice having a sensing DC current supplied thereto.

FIG. 2 illustrates a conventional orifice circuit wherein a DC source 8 is connected to the orifice circuit to provide a current $i_o$ to the orifice circuit, this current supply being bypassed for AC noise by a capacitor 8a. The voltage pulse generated in response to a particle traversing the orifice is therefore approximately equal to the current $i_o$ times the change in orifice resistance $\Delta R$ which is the current $i_o$ times the voltage $\Delta e$ times the resistance R. As previously stated, in order that a particle measuring system of the electric sensing zone type may be calibrated under all conditions, it is necessary that a particle of given size in a given orifice provide the same response and thus it is necessary to measure the resistance R of the orifice for a given electrolyte.

Figure 3:
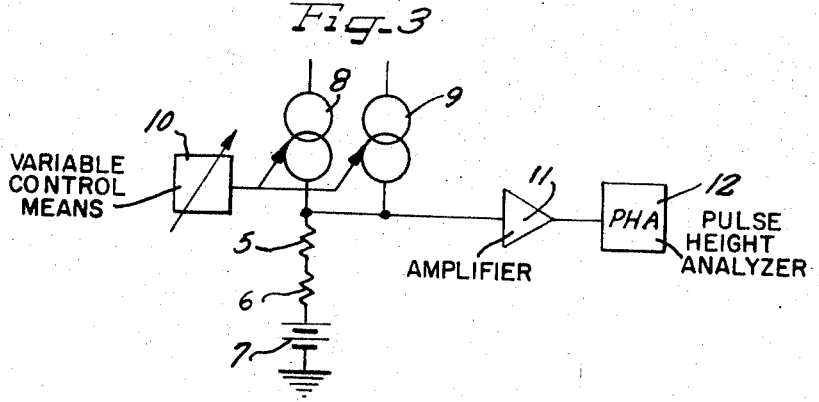
FIG. 3 is a schematic circuit diagram illustrating current normalization in accordance with the principles of the present invention.

Referring to FIG. 3, the orifice circuit 5, 6, 7 is provided with a first current generator 8 and a second current generator 9. The first current generator 8 is like that illustrated in FIG. 2; however, in FIG. 3, this generator is shown to be programmable by a variable control means 10. The second current generator provides particle pulse simulation and is illustrated to be simultaneously variable with the generator 8 by means of the control means 10. The orifice circuit is connected to an amplifier 11 for sensing the particle pulses and a pulse height analyzer (PHA) 12 is provided for performing size analysis as is well known in the art. The PHA may include an oscilloscope as a means of providing a display in response to detection of particle pulses by the amplifier 11.

Figure 4:
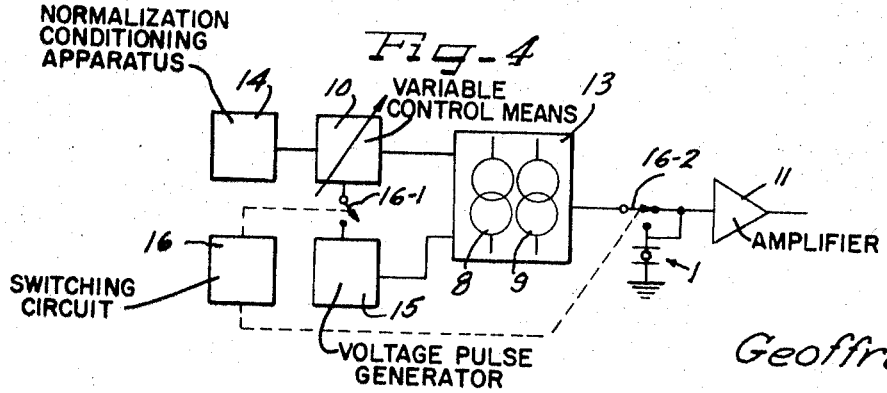
FIG. 4 is a schematic block diagram of a current normalizer constructed in accordance with the principles of the present invention.

Referring to FIG. 4, the two current generators 8, 9 are illustrated as being combined in a single circuit 13 which is programmed by a control means 10. The control means 10 is provided with means 14 for conditioning the apparatus for the normalization process. A voltage pulse generator 15 is provided to supply the circuit 13 with voltage pulses to effect the generation of current pulses and a switching circuit 16 is provided to (1) place the initiation of voltage pulses under the control of the precision voltage supply of the control means 10 and (2) control the bypassing of the filter circuit (not shown) of the orifice circuit, as will be discussed in greater detail below.

DETAILED DESCRIPTION

Referring to FIG. 5, the apparatus of FIG. 4 is illustrated in greater detail. The orifice 1 is connected to an amplifier 11 for sensing particle pulses and provided the same to PHA equipment 12. The orifice 1 and the input of the amplifier 11 are connected by way of a pair of resistors 19, 20 and a switch contact 16-2, which will be dealt with below, to the programmable current source 13.

The programmable current source 13 comprises a pair of transistors 17 and 18 connected in a Darlington configuration. The emitter of the transistor 18 is connected to a suitable voltage reference point by way of a resistor 21 and a potentiometer 22. The potentiometer 22 may advantageously be located on a control panel. The base of the transistor 17 is held at a precision voltage level by means of an operational amplifier 25 and its associated feedback loop which senses the voltage at the emitter of the transistor 18. The feedback loop includes a resistor 27 and a capacitor 28 in parallel therewith, the combination being serially connected between the emitter of the transistor 18 and the inverting input 26 of the amplifier 25. For the amplifier 25, any voltage applied to the input 30 must, by the stability criteria for an operational amplifier, be identical to the voltage found on the inverting input 26. The inverting input 26, however, is sensing the voltage at the emitter of the transistor 18; therefore, as the voltage is varied at the input 30, the base voltages of the transistors 17, 18 shift such that the voltage at the emitter of the transistor 18 is held at a precision reference point with respect to the reference voltage at the point 23. Hence, the resistor 21 and the potentiometer 22 serve to form a resistive reference for the current generator at the collectors of the transistors 17, 18.

A controlled precision voltage is provided to the input 30 of the amplifier 25 by way of the control means 10 which comprises a pair of transistors 31, 32. The transistor 31 includes an emitter which is connected to the collector of the transistor 32 by way of a resistor 33 and on to a point between −230 volts and ground at a junction of a power supply terminal of the operational amplifier 25 and a resistor 29. The operational amplifier may for example be of the 709 type wherein the seventh pin is connected to the resistor 29 and the fourth pin is connected to −230 volts DC. The collector of the transistor 32 and the emitter of the transistor 31, by way of the resistor 33, are connected to the reference point 23 by way of a zener diode 59 having a pair of capacitors 60, 61 connected in parallel therewith. In a particular realization of this circuit, the zener diode 59 was a 12-volt device.

The emitter of the transistor 32 is connected to the collector of the transistor 31 by means of a resistor 35 and on to the reference point 23 by way of a zener diode 36 having a pair of capacitors 37, 38 connected in parallel therewith. In the above-mentioned realization of this particular circuit, the zener diode 36 was also a 12-volt device.

The emitter of the transistor 32 is further connected to the reference point 23 by way of the divider 50 and its serially connected resistors 51–56, and to the input 30 of the operational amplifier 25 by way of a movable tap 57 of the divider 50 and a resistor 58.

The base of the transistor 31 is coupled to the reference point 23 by way of a capacitor 39 and is connected to the voltage divider 41–44 by way of a resistor 40.

The voltage dividers 41–44 and 50 provide precision voltages to the input 30 of the transistor 25. The divider 50 is variable in precision 2 to 1 steps yielding doublings in current change for each step and the potentiometer 44 is connected in parallel with the resistors 41, 42 such that over a 2 to 1 range, the change in voltage appearing at the input 30 of the amplifier 25 due to movement of the wiper of the potentiometer approximates, by hyperbolic approximation, the logarithm over a 2 to 1 range such that if a numbered dial from zero to one were associated with the shaft of the potentiometer, the zero to the one range of the dial could be considered as a mantissa of the logarithm to the base 2 for the change in voltage and, hence the change in current of the current generator. There is therefore provided a continuously variable fine adjustment, logarithmic in nature, with respect to rotation of the shaft of the potentiometer 44. This paralleling technique has been provided so that one could utilize, in lieu of a single turn log pot, a 10-turn linear pot for obtaining a logarithmic function of rotation.

The method of generating current pulses is to superimpose on the input 30 of the amplifier 25, small voltage pulses of constant fixed amplitude whose shape closely approximates the shape of pulses that would be generated by particles passing through the actual orifice, i.e. particle pulse simulation. The pulse generator 15 comprises a unijunction transistor 62 having its emitter electrode connected to the reference point 23 by way of a capacitor 63 and a resistor 64, and connectible to the potential of the conductor 34 by way of a resistor 65, a resistor 66 and a switch contact 16-1. One base of the unijunction transistor 62 is also connectible to the potential on the conductor 34 by way of the resistor 66 and the switch 16-1, while the other base of the transistor is connected to the reference point 23 by way of a resistor 69, a capacitor 70, and a resistor network 71–74. This base is further coupled to the input 30 of the operational amplifier 25 by way of a capacitor 75. Upon firing of the unijunction transistor 62, small current pulses are drawn from its power leads which would appear on the powerline bus and cause errors in the output signal; therefore, the circuit is provided with capacitance, by means of a capacitor 67 and a capacitor 68, to eliminate these small current pulses.

Upon closure of the contact 16-1, which will be explained below, the capacitor 63 begins to charge and the unijunction transistor 62 subsequently fires, as is well known in the art. The pulses generated by the unijunction circuit are therefore coupled to the input 30 by way of the capacitor 75.

Given a setting of the potentiometer 44, there will be a given voltage applied to the input 30 of the operational amplifier 25 and for a given setting of the resistor 22 (the normalize potentiometer) there will be a given current generated at the junction of the resistor 19 and the capacitor 78. In order to accomplish the normalization function, that is, with the pulse train, it is necessary that the pulses appearing at the junction of the resistor 19 and the capacitor 78 bear a specific predetermined relationship to the current generated in the DC realm. If, for example, a 4 milliamp current is generated at this junction, there must at the same time be a current pulse of, for example, 1 microamp. Hence, it is simply a matter of providing a precision resistor between the point and ground, for example, a 10,000 ohm resistor, and adjusting the potentiometer 22 to provide precisely 40 volts across the resistor to effect a 4 milliamp current. At this setting, that is, with the divider 50 set at the 4 milliamp position, the precision resistor 74 is adjusted to yield current pulses of the desired amplitude at the junction of the resistor 19 and the capacitor 78. In this manner, all circuit boards may be fabricated to yield the same identical results.

The current at the junction of the resistor 19 and the capacitor 78 is therefore a function of the voltage appearing at the input 30 of the operational amplifier 25 divided by the resistance between the emitter of the transistor 18 and the reference point 23, which applies to both the AC and DC current realms simultaneously. Therefore, adjustment of the potentiometer to vary the size of pulses viewed on an oscilloscope and seen at the junction of the resistor 19 and the capacitor 78 will simultaneously vary the DC current appearing at that point. The transistor 45 and its associated components together form a simple switch which, with the emitter of the transistor 45 held at ground or DC zero, prevents current flow through the collector of the transistor 45 to in turn prevent operation of the precision controlled voltage source 10. With the emitter of the transistor 45 at ground, therefore, no voltage is applied to the input 30 of the operational amplifier 25 and the apparatus is not operable. When the ground or zero (stop signal) is removed from the emitter of the transistor 45, the circuit is conditioned for operation. This stop signal is provided as a safety measure in that when the mercury column in the sensing apparatus reaches the upper limit of its travel, it grounds the emitter of the transistor 45 to turn off the entire current generator and therefore remove voltage from the orifice circuit, in particular from the orifice electrodes to prevent shock to persons raising and lowering samples and so forth.

The transistors 31 and 32, the zener diode 49, and the potentiometer 44 together form a temperature stable precision variable voltage source. The zener diode 49 is programmed by the current from the transistor 45, when the emitter of the transistor 45 is held at +5 volts or greater in this particular example, and a reference voltage with respect to the point 23 is generated and provided at the upper terminal of the potentiometer 44. Some fraction of this voltage appears on the wiper arm of the potentiometer 44 and is applied to the base of the transistor 31, an emitter follower, followed by the transistor 32, a complementary emitter follower, which is arranged such that the base-emitter voltage and temperature coefficient of these transistors are effective to cancel the effects of temperature changes. Therefore, the emitter of the transistor 32 provides the divider 50 with a precision variable reference voltage and the divider provides some fraction of that voltage to the input 30 of the operational amplifier 25.

All signals on the circuit board are referenced to the point 23, the voltage for the remainder of the board being derived by way of a dropping resistor 29, the zener diodes 36, 59 and a connection to −230 volts at the operational amplifier 25. In the particular realization of this circuit discussed above, the point 23 carried −218 volts and the conductor 34 was at −206 volts. These voltages serve to form the 12-volt supplies to drive the operational amplifier 25 and the remaining transistors.

The circuit is provided with a "normalize" button 16-5 connected in series with a winding 16-3 of a multipole relay between ground and a suitable supply, such as +24 volts. Upon depression of the button 16-5, the winding 16-3 is energized to effect closure of the contacts 16-1 and apply the potential on the conductor 34 to the oscillator formed by the unijunction transistor 62 and its associated components to initiate generation of a voltage pulse train. Other contacts of the relay operate other circuitry in the oscilloscope to effect operation in a specified manner, for example, to obtain a predetermined gain of an amplifier, etc. Upon closure of the contacts 16-1, a potential is provided to the base of a transistor 79 by way of a resistor 80 to turn on the transistor in a saturated condition thereby shunting the voltage appearing at the upper terminal of the resistor 44 to the point 23. This accomplishes the same end as grounding the emitter of the transistor 45 to turn off all DC current which could otherwise appear at the collectors of the transistors 17 and 18. Simultaneously, however, the unijunction transistor has begun producing voltage pulses. The pulses appearing at the first base of the unijunction transistor 62 are shaped by the zener diode 62', the resistor 69, the capacitor 70 and the resistors 71–74 and coupled to the input 30 of the operational amplifier by way of the capacitor 75.

During normal operation in particle analysis, the output of the current generator is connected to the orifice and to the amplifier 11 by way of a pair of resistors 19 and 20, modestly large resistance value, and coupled to ground by way of a large filtering capacitor 78. The filter 19, 20, 78 would not permit the current normalizing pulses to reach the orifice and effect the desired measurement. Therefore, it is necessary to bypass the filter and means are provided for accomplishing such a bypass function. A second relay winding, for example, a small reed relay winding 16-4 is connected in parallel with the relay winding 16-3 and operated therewith under the control of the normalize button 16-5 so that upon depression of the normalize button 16-5, a set of contacts 16-2 are operated to bypass the filter circuit and connect the collectors of the transistor 17, 18 directly to the circuit of the orifice 1 and the amplifier 11. In addition, the amplifier 11 is provided with a feedback circuit including a resistor 76 and a capacitor 77 connected in a well known bootstrap configuration to increase the input impedance of the amplifier 11 and provide a unity gain therefor. The feedback circuit is connected between the output of the amplifier 11 and a non-inverting junction between the resistors 19, 20.

Although I have described my invention by reference to a specific exemplary embodiment thereof, including specific reference to an operating circuit realization, many changes and modifications of my invention may become apparent to one skilled in the art without departing from the spirit and scope of my invention, and it is to be understood that I intend to include within the patent warranted hereon all such changes and modifications as may reasonably and properly be included within the scope of my contribution to the art.

I claim:

1. Apparatus for normalizing the current delivered to a particle sensing zone which has a variable resistance characteristic aNd which has a current generating device coupled thereto, said apparatus comprising:
   a voltage source operable to provide a precise voltage;
   current generator means connected to said sensing zone and to said voltage source and operable to provide particle sensing current in accordance with the voltage supplied thereto;
   voltage pulse generator means connected to said current generator means and operable to superimpose voltage pulses on the voltage supplied to said current generator means to effect the provision of simulated particle current pulses at said sensing zone; and
   adjusting means for adjusting the particle sensing current and the simulated particle current pulses simultaneously.

2. Apparatus according to claim 1, wherein said voltage pulse generator means includes means connected to said voltage source to receive a supply potential therefrom and operable to generate said voltage pulses in accordance with the value of supply potential received, and wherein said adjusting means includes means for simultaneously varying the voltage potentials supplied to said voltage pulse generator means and said current generator means.

3. Apparatus according to claim 1, wherein said voltage pulse generator means includes an oscillator for producing pulses and a pulse shaper for shaping the pulses of the oscillator to a Gaussian shape.

4. Apparatus according to claim 1, wherein said current generator means includes an input amplifier having first and second inputs, said first input connected to said voltage pulse generator means, an output amplifier coupled between said input amplifier and said sensing zone, and a stability feedback circuit connected between said output amplifier and said second input of said input amplifier.

5. Apparatus according to claim 1, wherein said adjusting means includes first means in said voltage source for providing amplitude doublings of voltage ranges to said current generator means and to said voltage pulse generator means and second means for varying the potential within the doublings.

6. Apparatus according to claim 1, comprising means for turning said voltage source on and off.

7. Apparatus according to claim 1, comprising means operable to shunt said voltage source and render said apparatus operable in response to said voltage pulses only.

8. In particle size analysis apparatus of the type which has a source of direct current connected to a particle sensing zone having a variable resistance characteristic and operable to modulate the direct current and generate a pulse in response to a particle traversing the sensing zone, a pulse sensing amplifier preceded by a filter connected to the source of direct current, means connected to the amplifier for indicating the size of the particle pulses, start-stop means including start and stop contacts operable to initiate and terminate operation of the particle analysis apparatus, the improvement therein comprising:
   said source of direct current including an adjustable voltage source operable to provide selected potentials and a direct current generator connected to said voltage source and operable to provide direct current in accordance with a selected potential; and
   a voltage pulse source connected between said adjustable voltage source and said direct current generator for controlling said direct current generator to simulate particle pulses in accordance with a selected potential.

9. Particle size analysis apparatus, comprising:
   a particle sensing zone for receiving a flow of particles and having a variable resistance characteristic, said zone including an orifice tube and an electrolyte immersing said tube and for suspending particles therein;
   a source of direct current connected to said particle sensing zone, the direct current being modulated by particles traversing the orifice of said tube to generate particle pulses, said source of direct current including an adjustable voltage source operable to provide selected potentials and a current generator operable to provide a direct current in accordance with a selected potential;
   display means connected to said sensing zone for indicating the magnitude of particle pulses;
   particle pulse simulator means connected to said current generator and effective to cause said current generator to produce simulated particle pulses; and means for adjusting the output of said current generator to normalize the current delivered to said sensing zone and compensate its variable resistance.

10. In particle size analysis apparatus of the type wherein at a sensing zone particles are suspended in an electrolyte and caused to flow through an orifice of a tube immersed in the electrolyte, a source of direct current has terminals in the electrolyte on each side of the orifice, and means are connected to the terminals for sensing modulations of the direct current as particle pulses in response to particles traversing the orifice and displaying particle size information in accordance with the size of the particle pulses, the improvement therein comprising:

means connected to said source of direct current and operable to cause said source to provide simulated particle pulses at its terminals; and adjustable means for normalizing the output of said source of direct current to compensate for resistance variations effected by the orifice, the electrolyte and the counter emf contact potentials of the terminals.

* * * * *